United States Patent [19]

Korenberg

[11] Patent Number: 4,501,006
[45] Date of Patent: Feb. 19, 1985

[54] HOT-BOX SIGNALLING DEVICES

[76] Inventor: Michael Korenberg, 626 Algonquin Ave., Montreal, P.Q., Canada

[21] Appl. No.: 427,032

[22] Filed: Sep. 29, 1982

Related U.S. Application Data

[62] Division of Ser. No. 178,189, Aug. 14, 1980, abandoned.

[51] Int. Cl.³ .............................................. H03K 5/13
[52] U.S. Cl. ......................................... 377/45; 377/3; 116/216; 116/DIG. 38; 246/169 A; 340/52 R; 340/682
[58] Field of Search ................... 116/106; 377/3, 6, 45

[56] References Cited

U.S. PATENT DOCUMENTS

| | | | |
|---|---|---|---|
| 3,727,045 | 4/1973 | Warren | 116/216 |
| 3,728,635 | 4/1973 | Eisenberg | 377/45 |
| 3,792,241 | 2/1974 | Sullnan | 377/3 |
| 4,021,644 | 5/1977 | Dreslinski | 377/45 |
| 4,270,041 | 5/1981 | Pleyber | 377/45 |

FOREIGN PATENT DOCUMENTS

| | | | |
|---|---|---|---|
| 636042 | 2/1963 | Belgium | 116/220 |

Primary Examiner—Robert I. Smith
Attorney, Agent, or Firm—Rogers, Bereskin & Parr

[57] ABSTRACT

Hot-box signalling devices are disclosed for indicating the presence of overheated bearings in vehicles such as rail cars. The device includes means defining a closed compartment containing a fluid and pressure-sensitive means communicating with the compartment. The compartment is arranged in thermal communication with a bearing of the vehicle so that increases in the temperature of the bearing cause increases in the pressure exerted by the fluid. The pressure-sensitive means is adapted to produce a signal when the pressure exerted by the fluid exceeds a predetermined threshold representing an over-temperature condition in the bearing. Preferably, the pressure-sensitive means takes the form of a plug normally closing an opening in the compartment, and a marker material, the plug and marker material being expelled when the pressure in the compartment reaches said predetermined threshold. In one aspect of the invention, provision is made to compensate for ambient temperature. The invention also provides a system for detecting a signal produced by a hot-box signalling device.

4 Claims, 8 Drawing Figures

HOT-BOX SIGNALLING DEVICES

This is a division of application Ser. No. 178,189 filed Aug. 14, 1980 and now abandoned.

This invention relates generally to devices used on moving vehicles, such as rail cars, to indicate the presence of an overheated bearing. For convenience, such devices will hereinafter be referred to as "hot-box signalling devices". The invention is also concerned with a system for detecting a signal produced by a signalling device of this or other types.

Hot-box signalling devices of various forms have previously been proposed. For example, Canadian Pat. No. 328,392, (issued Oct. 4, 1932 to Faus), discloses a device comprising a housing which is in thermal communication with the bearing and which is filled with a liquid and closed by a fusible plug. When the bearing reaches a predetermined temperature, the plug melts, and the liquid becomes a vapour which streams out from the device. The liquid is chosen so that its vapour is easily recognizable by the train crew.

Such a device has a number of disadvantages. For example, the plug may tend to re-seal resulting in an indistinct signal. Also, prior devices have not included provision for ambient temperature compensation; if adjusted to give suitable operation in normal warm weather, the device may not give a signal in good time in cold weather. For example, it has been reported that on a very cold day, the temperature of a normal journal box can be $-10°$ F., while a developing hot-box might have a temperature as low as $20°$ F. The latter temperature is of course well below the normal operating temperature of a journal on a hot day, and accordingly the normally adjusted hot-box detector would not signal the developing hot-box.

Proposals have been made for hot-box detectors with ambient temperature compensation, one such device being described in Canadian Pat. No. 703,819, which issued Feb. 16, 1965 to Servo Corporation. This device, however, does not operate on the principle described above, but instead is a track side mounted device having sensing means for detecting heat radiated from the bearings of passing trains. This device is rather complicated and expensive.

U.S. Pat. No. 3,727,045, (issued Apr. 10, 1973 to Minnesota Mining and Manufacturing Company), discloses hot box signalling devices which cause a marker material to be expelled onto the roadway in response to a predetermined temperature being developed within the journal box. This patent additionally proposes a detector at the rear end of the train which automatically detects the presence of marker on the roadway, and gives a signal to the train crew. The detector is a scanning device which is intended exclusively to detect the marker material and to produce a warning signal. The marker is intended to provide a visibly detectable target, and may for example be paint, fluorescent or retroreflective materials, or may be a fluorescent material detectable by a scanner sensitive to ultraviolet light. Various types of optical scanning devices are proposed.

The basic system described in U.S. Pat. No. 3,727,045 requires of course the use in all the signalling devices of one specific exclusively-detected marker material which would not otherwise be present on the track. Thus once this system is in use, it will not be possible to load subsequent signalling devices with a different marker material because the scanning devices in use exclusively detect the first marker material. The system is therefore vulnerable to abrupt increases in price of or shortages in the marker material used, or to the risk that the material is subsequently banned as an environmental hazard. The system is also likely to be subject to false alarms since there is the possibility that material which operates the scanning device will be present on the roadway before the train approaches. This patent proposes two solutions to this problem: firstly the use of a self-destructing type of marker material, or a mixture of the marker material with some substance which will destroy its effectiveness after a short period, and secondly the use of a photo scanner which will trigger some ejecting device to place a covering on the marker material already on the roadbed. However, even if these solutions would be effective to prevent marker material released by one train from causing a false alarm in a subsequent train, they do not take account of the possiblity of the presence of marker material on the track for other reasons, and to which the photo scanner is sensitive. Thus, some reflective material such as silver paper or glass may have been dropped onto the roadbed, or some such material may be placed on the roadbed deliberately by a vandal wishing to stop a train.

An object of the present invention is to provide an improved hot-box signalling device of relatively simple form. A further object of the invention is to provide a system for detecting a signal produced by a signalling device of this or other form.

According to a first aspect of the invention there is provided a hot-box signalling device responsive to an over-heated bearing in a vehicle. The device comprises means defining a closed compartment containing a fluid and pressure-sensitive means communicating with said compartment. The compartment is arranged in thermal communication with the bearing so that increases in the temperature of the bearing cause increases in the pressure exerted by the fluid. The pressure-sensitive means is adapted to produce a signal when the pressure exerted by the fluid exceeds a predetermined threshold representing an over-temperature condition in the bearing.

The pressure-sensitive means may take various forms. In one case, a radio transmitter actuated by a pressure-responsive diaphragm or other actuator may be employed to transmit a signal to a radio receiver, say, in the cab or caboose of a train. Preferably, however, the pressure-sensitive means comprise a plug normally closing an opening in the compartment, and a marker material, the plug and marker material being arranged to be expelled when the pressure in the compartment reaches the predetermined threshold pressure. The device will then be arranged on the vehicle so that the marker material is expelled onto the ground over which the vehicle is passing. According to a further embodiment of the invention, means may be provided to compensate for changes in ambient temperature so as to avoid a false signal caused by high ambient temperatures.

According to a second aspect of the invention, there is provided a system for detecting a signal produced by a vehicle-mounted signalling device of the type adapted to expel a marker material in response to an abnormal condition sensed by the device. The system may include a first detector adapted to be mounted at a forward position on the vehicle in front of all the signalling devices carried by the vehicle, a second detector adapted to be mounted at a rear position on the vehicle behind all of these said signalling devices, and comparator means to which the detectors are connected. Each of the detectors is adapted to detect and respond to the presence of the marker material expelled by one of the signalling devices, and thereupon to produce a signal. The comparator means are adapted to produce an output signal only when an input signal is received from the second detector without being preceeded by a corresponding input signal from the first detector.

In order that the invention may be more clearly understood, reference will now be made to the accompanying drawings which illustrate a number of preferred embodiments of the invention. In the drawings.

Figure 1:
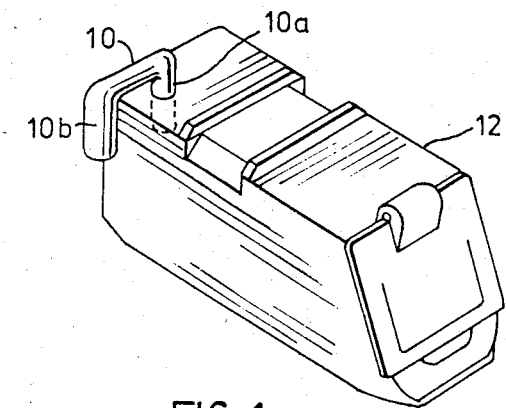
FIG. 1 is a perspective view of a signalling device according to the invention shown mounted on a plain bearing assembly for a rail car.

Referring firstly to FIG. 1, a hot box signalling device according to the invention is indicated generally at 10 and is shown as having one end portion 10a connected to the top of a bearing box 12, and in thermal communication with the bearing, and having a second end portion 10b exposed to ambient temperature, and spaced away from the side of the bearing box. The device is in the form of a pressure resistant tube of circular cross-section, and having an inverted U-shape with a small diameter vertically extending end portion 10a, the lower end of which projects into the bearing box, a central horizontal portion, and a large diameter vertically extending portion 10b.

Figure 2A:
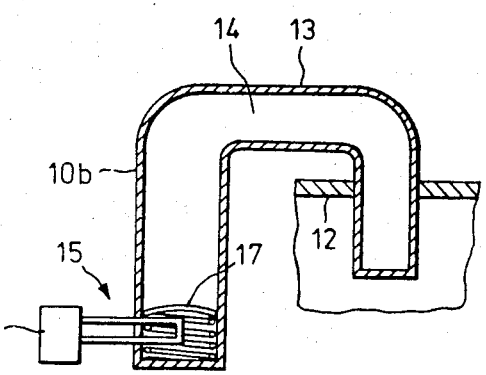
FIG. 2a is a longitudinal sectional view through a signalling device according to the invention mounted as shown in FIG. 1.
Figure 2B:
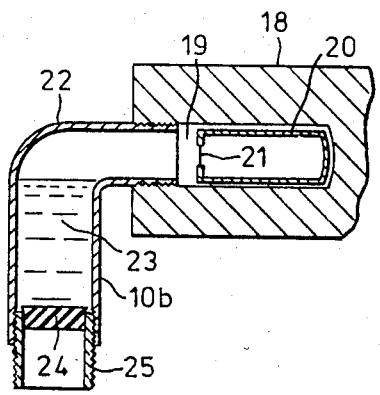
FIG. 2b is a view similar to FIG. 2a showing a modified form of the device.
Figure 2C:
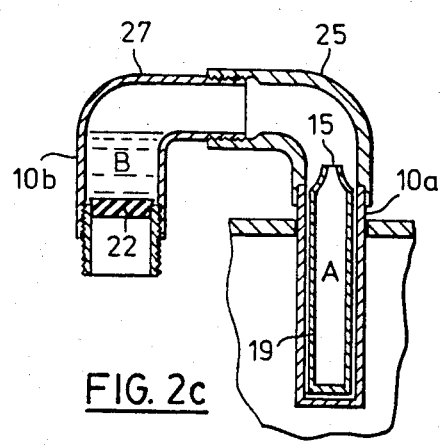
FIG. 2c is a view similar to FIGS. 2a and 2b showing a signalling device having ambient temperature compensating means.

FIGS. 2a, 2b and 2c are longitudinal sectional views through three alternative forms of signalling device 10. FIG. 2a shows an extremely simple form of the device, in which the U-shaped tube is indicated at 13 and defines an internal compartment 14 containing a fluid, the pressure of which will increase with increases in temperature in the bearing in box 12. The fluid in compartment 14 is a member of the family of fluorinated hydrocarbons known as FREON TM, manufactured by DuPont, Inc., Montreal, Quebec, Canada, the characteristics of which will be described in more detail later with reference to FIG. 2c. Pressure-sensitive means generally indicated at 15 communicate with compartment 14 and are adapted to produce a signal when the pressure exerted by the fluid exceeds a predetermined threshold representing an over-temperature condition in the bearing. In this particular embodiment, the pressure-sensitive means 15 comprises a radio transmitter 16 and a spring-biased pressure-sensitive diaphram 17 which responds to the pressure in compartment 14 and which is arranged to cause transmitter 16 to generate a radio signal when that pressure exceeds the threshold pressure. The vehicle to which the device is fitted would then also be provided with a radio receiver located, for example, in the cab or caboose in the case of a train, which would indicate an over-temperature condition to the operator of the vehicle.

TM denotes trade mark throughout the disclosure.

While this form of pressure-sensitive means may have advantage in certain applications, in the case of a hot-box signalling device for a rail car, it may be preferable to employ pressure-sensitive means in the form of a plug and marker material which are arranged to be expelled from the device when the threshold pressure is achieved. FIG. 2b illustrates a device of this form. That view also shows an embodiment in which the fluid is contained within a cartridge, although it is to be understood that this is not essential; the plug and marker material arrangement of FIG. 2b may be used directly in a compartment such as that shown in FIG. 2a.

FIG. 2b shows a device particularly designed for use with a roller-type bearing although a device having the compartments shown in that view could equally well be used with a plain bearing assembly of the form shown in FIG. 1. An adapter for use with roller bearings is indicated at 18 and is formed with a bore 19 which receives a cartridge 20. The cartridge is of a commercially available ethyl mercaptan type of heat indicator such as that sold under the designation Timken K-33082. Thus, cartridge 20 contains the pressure-responsive fluid. The cartridge has an opening 21 which is normally closed by a thermo-sensitive seal arranged to rupture at or before the temperature of the bearing reaches an over-heated condition.

In an alternate embodiment, pressure-sensitive means arranged to rupture at or before the temperature of the bearing reaches an over-heated condition may be used in place of the thermo-sensitive seal. The pressure-sensitive means may be any of the various alternatives described below in connection with FIGS. 2c and 4.

Alternately the cartridge may contain a fluid which exerts a pressure sufficient to expel the plug and marker even at ambient temperatures and would not require further heating by excessive bearing temperature to achieve the required pressure. In such circumstances, the thermo-sensitive seal can be designed to rupture or otherwise release the fluid (for example, melt) when the bearing reaches an overheated condition, in which case only the thermo-sensitive seal need be in thermal communication with the bearing. It will be appreciated that in such an embodiment, the pressurized fluid must be isolated from the marker material and plug during normal operation, and effectively kept in a separate container such as the cartridge 20 illustrated in FIG. 2b.

An elbow 22 is screw threaded into the outer end of bore 19 and contains a marker material 23 contained by a plug 24, retained, until ejection, by nipple 25. A temporary membrane of paper or the like may be provided at the opposite end of elbow 22 for containing the marker material during assembly of the device but is not essential to the invention.

It will be appreciated that the pressure in cartridge 20 will increase with the temperature of the bearing and that the seal in opening 21 will rupture at or before an over-temperature condition is achieved. As fluid escapes from the cartridge, the pressure exerted by this fluid on the plug 24 will build up. When the threshold pressure is reached in elbow 22, the marker material will be ejected in a burst on to the ground below the vehicle. In this particular embodiment, the threshold pressure is achieved by heating of the fluid because of heat transfer from the over-heated bearing, although alternately, as described above, the pressure of the fluid in cartridge 20 may be arranged to be sufficiently high to begin with.

Reference will now be made to FIG. 2c in describing a hot-box signalling device having ambient temperature compensation means.

Referring to FIG. 2c, the portion 10a of the device is a hollow copper pipe or tube which is permanently sealed at its lower end. The copper material tends to assist thermal communication with the bearing of the rail car. Portion 10a forms a substantially air-tight connection with a brass 90° elbow 25 which forms a substantially air-tight connection with a cast iron reducing elbow 27. Suitable elbows 25 and 27 are available from Crane Supply, Montreal, P.Q. Elbows 25 and 27 are screwed together using tapered threads on which one of the compounds manufactured by the Loctite Corp. (hereinafter called LOCTITE TM) has been applied, to assist in producing a tight connection. Elbow 25 slips snugly onto the upper end of portion 10a, and LOCTITE TM is applied to the contacting surfaces of 10a, 25 to assist in forming a substantially air-tight connection. As seen in FIG. 2c, the housing formed by these components has a hollow interior which contains a cartridge 19 substantially filling the vertical, cylindrical portion 10a of the housing. The cartridge 19 forms a first compartment A. Compartment B constitutes the vertical, cylindrical portion 10b and the central horizontal portion of the housing. The cartridge 19 is shown as closed by a rupturable membrane 15 disposed at the upper end of cartridge 19. The membrane 15 is arranged to rupture at a predetermined pressure difference between the compartments A and B.

The cartridge 19 underneath membrane 15 contains fluid which is preferably a low boiling point liquid, chosen to have a substantial vapor pressure at a temperature of the portion 10a corresponding to the lowest temperature at which the bearing box 12 may have a well-developed hot-box. Thus there is a pedetermined bearing temperature at which the device is actively responding, but actuation of the device depends on the ambient temperature and other factors as well as on the bearing temperature. Alternately, a gas may be used in the cartridge 19. Preferably the fluid does not exert a very substantial pressure at temperatures corresponding to cold day operating bearing temperatures. Therefore abnormal heating of the fluid, such as on account of a hot-box, is then necessary to provide sufficient energy so that the fluid can burst the cartridge and displace the plug and produce a signal. This reduces the possibility of device 10 falsely producing a signal, even for example if cartridge 19 develops a leak.

A suitable cartridge is an unannealed aluminum shell with cover, which was obtained from Montebello Metal Ltd., Hawkesbury, Ontario. Preferably the cartridge is substantially filled with a fluid such that, so long as the cartridge remains intact, the same fluid is in part liquid and in part gas. The pressure exerted by the fluid will then depend only upon its temperature and not upon the quantity of the fluid in the cartridge, thereby making quantity control less critical during loading of the cartridges.

A suitable fluid can be selected from the FREON TM family of Fluorocarbon compounds including blends, mixtures, azeotropes, and so on, such as FREON-114 TM, manufactured by DuPont, Inc., Montreal, P.Q., the choice depending partly on the range of temperatures corresponding to an overheated bearing at which actuation of the device is to occur. Similar criteria apply in selecting suitable fluids for the other forms of signalling device disclosed herein.

The shell is closed by a rupturable membrane at one end and open at the other end. The thickness of the membrane can be controlled during manufacture of the shell to predetermine the pressure difference across the membrane which causes it to rupture. In other embodiments, the cartridge may burst other than at its membrane or the cover which seals the open end may come off.

The chilled fluid is poured into the shell to substantially fill the shell through the open end. The cover is then put over the open end to seal the shell. The cover is held onto the shell by LOCTITE TM. A silicone sealing compound, such as manufactured by the Dow-Corning Co. is inserted inside the cover before the cover is put over the open end of the shell. This compound helps to improve the seal obtained using the cover.

The cartridge may also contain a substance which is adapted to neutralize quickly the marker material in compartment B after mixing with it, thereby limiting the lifetime of the marker material once it has been expelled and served its purpose. The cartridge may also contain various odoriferous or smoke or flame producing materials so that the location of the over-heated bearing is easily ascertained once the alarm has been given and the train stopped.

Compartment B also contains a fluid, which is again a low boiling point liquid, and this is chosen to evaporate at normal daytime temperatures, and is such as to produce little pressure on cold days, but a fairly substantial pressure on hot days. The maximum pressure which is produced by this fluid, by reason of high ambient temperatures, is however less than that produced by an incipient hot bearing within the box 12.

Compartment B is closed at its lower end by a pressure resistant plug 22 designed to retain fluid in compartment B until a predetermined pressure exists in this compartment.

A suitable fluid can be selected from the FREON TM family of Fluorocarbon compounds including blends, mixtures, azeotropes, and so on, manufactured by DuPont Inc., Montreal, P.Q., the choice partly depending on the extent to which actuation of the device is to vary as a function of ambient temperature. Alternately, the fluid may be air. However the fluid and quantity chosen must be such that the pressure in compartment B is never sufficient under operating conditions, of itself, to displace the plug. A suitable plug is a solid tapered stopper made of neoprene available from Fisher Scientific Co. Ltd., Montreal, P.Q., and which is resistant to many chemicals and to long-term exposure to air. The stopper is inserted, wide diameter first, into the lower end of compartment B, and then a nipple is threaded into the lower end of compartment B. Preferably, LOCTITE TM is applied to the thread to ensure a tight connection. A suitable nipple is available from Crane Supply, Montreal, P.Q. The wide end of the stopper has a greater diameter than the inner diameter of the nipple and therefore requires a substantial force acting on the wide end of the stopper to expel it. In some cases it may be necessary to shorten the stopper by cutting off the last portion at the wide end. It then will require less force to cause the stopper to deform sufficiently to pass through the nipple and be expelled. Compartment B above the stopper will contain sufficient marker material and fluid to prevent the stopper from being pushed from its lower end into compartment B.

Compartment B contains a marker material chosen so as to be readily recognizable, preferably by automatic sensing devices, when expelled onto a railway bed. The particular material used is not central to this invention, and for example may include any non-visible luminescent material such as non-visible fluorescent material, or any non-visible polarizing material or radioactive or magnetic material, or more generally any material capable of acting as a emitter, reflector, or absorber of energy such as to be recognizable by a sensing device. Further information as to materials which may be used are given below in this application.

However, a preferred material is a chemical known as anthracene, mixed with carbon, the mixture being such that this blends with the normal road bed so as not to be noticeable, but the anthracene having the property of being fluorescent in ultraviolet light, and easily detected by automatic means. Further information as to sensors, and particularly an arrangement which precludes false alarms being caused by marker material previously placed on a track by another train, is described below in this application.

Compartment B may also contain various odoriferous or smoke or flame producing materials so that the location of the overheated bearing is easily ascertained once the alarm has been given and the train stopped.

Operation of the device of FIG. 2c will now be described, partly by reference to FIG. 3.

In normal use, compartment A is heated primarily by the bearing in box 12, and compartment B has its temperature largely determined by the ambient temperature, although of course there will be thermal conduction between the ends of the device itself so that the temperature of each end will have some effect on the other end. In this connection, reference to compartment A being in thermal communication with the bearing, and compartment B being exposed to ambient temperatures, will be understood as including the case where there is some transfer of heat between compartment A and the atmosphere, and some transfer of heat between the bearing and compartment B.

Figure 3:
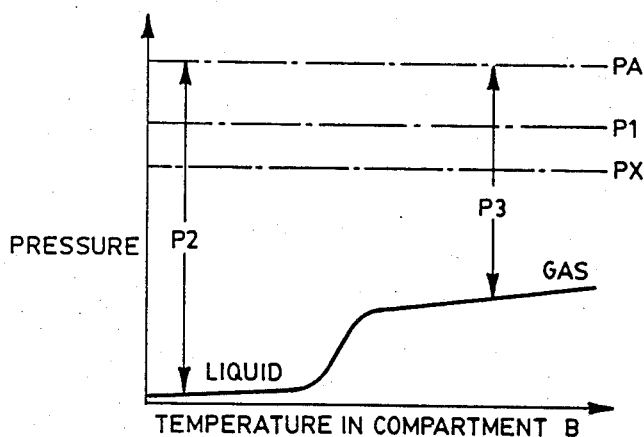
FIG. 3 is a graph (not to scale) showing a possible relationship between temperature and pressure when a small amount of liquid is used as part of the ambient temperature compensation means in the device of FIG. 2c.

Fig. 3 particularly illustrates the conditions where the pressure in compartment A has been raised to a predetermined pressure PA by the bearing attaining a temperature which, on a cold day, would indicate a hot box, but which on a hot day would indicate a safe running condition. This pressure in compartment A is higher than the net pressure P1 required to burst the membrane, which itself is higher than the pressure required to release the plug 22, and which is indicated in FIG. 3 at PX.

The left hand side of FIG. 3 shows the conditions on a cold day, and it will be seen that for such a day the pressure in compartment B is very small relative to that in compartment A. Thus, the net pressure on the membrane 15 is almost equal to the pressure in compartment A, and is sufficient to burst the membrane. Once the membrane has burst, further vaporization of the liquid in compartment A causes this pressure to prevail throughout the enclosure formed by the housing, so that this pressure is applied to the plug and this item is ejected. The marker material in compartment B is then blown onto the ground underneath the car, and this is detected by the automatic sensor at the end of the train. Thus, a signal is automatically produced which will warn the train crew.

It will be observed that actuation of the signalling device does not depend on momentary bearing temperature but rather on approximately steady state heat flow for a minimum time period attributable to a specific bearing source. Thus marker is not expelled at a temperature spike, instead actuation can occur only after a minimum amount of heat has flowed from the bearing to the signalling device. In this connection, reference to an excess temperature of a bearing relative to ambient temperature will be understood as including the case where said minimum amount of heat has flowed from the bearing to the signalling device.

The right hand side of FIG. 3 shows the conditions on a hot day. The ambient temperature conditions around the compartment B have caused a build up in pressure in compartment B, so that the pressure of gas in this compartment is now a considerable proportion of the pressure in compartment A, and this pressure in compartment B partially balances the bursting pressure on the membrane from compartment A. The net pressure P3 is less than P1 and is thus insufficient to burst the membrane. Also, the pressure in compartment B is never sufficient under operating conditions, of itself, to displace the plug 22, so no signal is produced.

Figure 4:
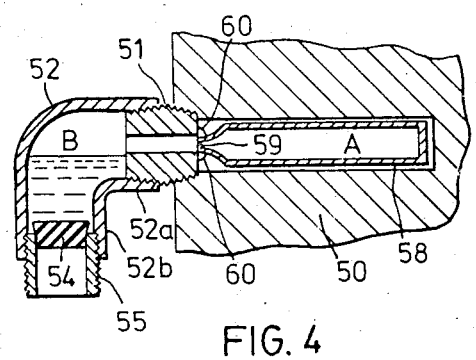
FIG. 4 is a longitudinal sectional view through a signalling device according to a further embodiment of the invention.

A signalling device according to a further feature of the invention and primarily suitable for roller bearings is shown in FIG. 4. Numeral 50 denotes a roller bearing adaptor which is in thermal communication with the bearing. The adaptor has a cylindrical cavity with a tapered screw threaded outer end, and this outer end receives one end of a nipple 51 connected at the other end to a housing 52 in the form of a tubular elbow. The elbow has a horizontal portion 52a of relatively small diameter which screws onto the nipple which screws into the adaptor, and has a larger diameter vertical portion 52b closed at its lower end by a plug 54. The plug 54, which is held in place by nipple 55 below and by marker material and fluid above, is of the same type and operates in the same fashion as that of the embodiment of FIG. 2c. Preferably 52 is a cast iron reducing elbow which forms substantially air-tight connections with nipples 51, 55. Preferably nipple 51 forms a substantially air-tight connection with adaptor 50. Suitable nipples and elbows are available from Crane Supply, Montreal, P.Q. The connections of nipple 55 and elbow 52, elbow 52 and nipple 51, and nipple 51 and adaptor 50 are made using tapered thread on which LOCTITE TM has been applied to assist in providing a tight connection. The outer end of nipple 51 is closed by a rupturable membrane 59 formed by the outer end of a cartridge 58. The cartridge 58 is attached in a substantially air-tight manner to nipple 51 by epoxy 60 in a manner which does not interfere with membrane 59. The membrane 59 maintains in place a low boiling point fluid, mixed with a marker material, within the housing 52 while this is being assembled onto the adaptor 50. In order to assemble, the cartridge 58 containing a low boiling point fluid is inserted in the cavity of the adaptor. The membrane 59 performs a function similar to that of membrane 15 of the embodiment of FIG. 2c, and is adapted to rupture at a predetermined pressure difference such as is produced when there is very low pressure in the housing, and when the pressure within compartment A (the cartridge) corresponds to the temperature of a hot-box on a cold day. In this particular case, the fluids and the cartridge are the same as those of the embodiment of FIG. 2c. However it may be desirable to have different actuation temperature ranges for plain and roller bearings, which can be achieved by changing the fluids used in the two compartments, the net pressure at which the membrane will rupture, and the pressure required to release the plug.

Operation of the embodiment shown in FIG. 4 is similar to that of the embodiment of FIG. 2c. Specifically, the cartridge 58 forms a first compartment A which is thermally responsive, primarily, to the bearing, and the compartment B (which constitutes housing 52 and nipple 51) is exposed to the ambient temperature. There is normally a pressure balance between the fluid of the cartridge 58, and that of compartment B, which act on opposite sides of the membrane 59. In this embodiment, the marker material is mixed with the fluid in compartment B.

It will be apparent that the arrangement of a membrane which is rupturable at a predetermined pressure difference across it, and which closes a cartridge, provides a convenient arrangement whereby the pressure in compartment B can affect the pressure required in compartment A in order for the two compartments to communicate. However it will be understood that many other devices could be used to achieve this purpose. For example a barrier, piston, plug, stopper, cork, cover or lever could be used to close compartment A which on the other side is subject to the back-pressure in compartment B. The barrier, piston, plug, stopper, cork, cover or lever would allow the two compartments to communicate when the pressure in compartment A exceeds that in compartment B by a predetermined amount. Alternately the two compartments may be separated by a valve which will vent compartment A into compartment B at an opening pressure which depends on the pressure in compartment B. In this connection, reference to a membrane separating the two compartments and adapted to rupture or otherwise open at a predetermined pressure difference between the compartments will be understood in the disclosure and claims as including the case where a barrier, piston, plug, stopper, cork, cover, lever, valve or other device is used so that the pressure in compartment B can affect the pressure required in compartment A for the two compartments to communicate.

Although, in certain embodiments described above a plug is used to close a compartment containing marker material, other alternate forms of sealing may be used, for example a rupturable membrane could be arranged to close the compartment.

It will be apparent that the arrangement of marker material in a compartment closed by a rupturable seal provides a convenient pressure-sensitive device which produces a signal on the production of a predetermined pressure in compartment B. However, it will be understood that many other pressure-sensitive signalling devices could be used, for example a radio signal could be produced as indicated above, or an arrangement could be devised which would produce a flare at a predetermined pressure or would apply the train's brakes.

The signalling device of this invention is readily attached to various bearing parts, for example housings or axles, but may also be attached to rotating parts such as axles or wheels, since an overheated journal conducts its heat to the wheel and the device would therefore be in thermal communication with the bearing. No external source of power is required. The devices are preferably mounted on distinct sides of the vehicle so that sensors can detect at which side of the vehicle the hot-box has occured. Preferably also, the devices are so arranged, or are provided with deflectors, so that a portion of the marker material remains on the vehicle to allow the position of the hot-box on the vehicle to be readily detected.

The marker material may be contained in the cartridge, rather than outside it.

It will be appreciated that the particular temperature or range of temperatures, as the case may be, to which the device will respond will depend on the operating criteria for the particular bearing, and will vary from case to case. Similarly the pressures developed in the compartment(s) of the device, and the net pressure at which the membrane will rupture (where provided) will vary for different bearings.

Figure 6:
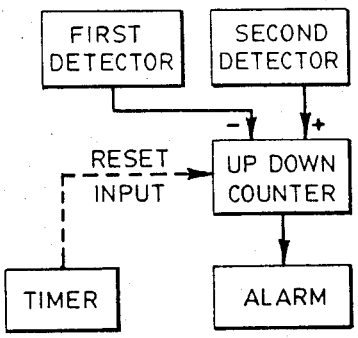
Figure 5:
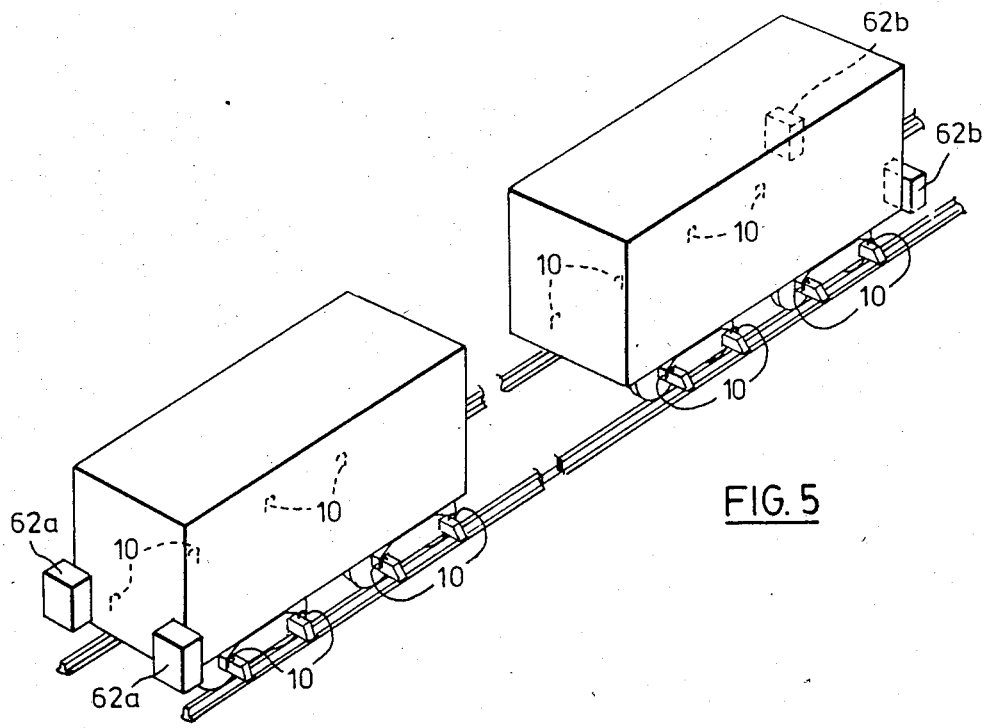
FIG. 5 is a diagrammatic illustration of a system for detecting a signal produced by a hot-box signalling device according to a further aspect of the invention; and, FIG. 6 is a block diagram illustrating a further embodiment of the system shown in FIG. 5.

FIGS. 5 and 6 of the drawings illustrate a further aspect of the invention and show a system for detecting a signal produced by a signalling device which may be of the form disclosed in this application or of some other form. The system is designed to promote a wide variety of common materials to be used interchangably as the marker in the signalling devices in contrast to the prior art systems, for example as described in U.S. Pat. No. 3,727,045 discussed above. The system of the invention also prevents a false alarm being given when a train passes over marker material left by a previous train or when marker material is accidently or deliberately placed on the track and to which the scanning devices are sensitive.

FIG. 5 shows a schematic arrangement of hot-box signalling devices and scanners on a train. FIG. 6 shows a schematic arrangement of first and second detectors, an up-down counter, and an alarm. A modification of this arrangement comprising a timer which produces a reset signal received by the counter is shown in ghost outline.

Each axle journal of the train is provided with a hotbox signalling device 10 of the type described above in this application. The device described above in this application includes a compartment holding a marker material, which may be mixed with an ejecting fluid, and which is blown out of one end of the device when the temperature in the journal box reaches an excess level as compared to the ambient temperature. The devices described above in this application are advantageous firstly in that they provide a simple and reliable device, they provide a device which includes ambient temperature compensation so that a hot-box can be reliably detected even on a very cold day, and they do not require any source of electrical power.

One of the devices 10 is mounted on each bearing box, and the marker discharge end of each device is positioned on the appropriate side of the rail car so that it discharges marker material onto that side of the track centreline on which the hot box occurs, so that it is possible to differentiate between marker material released from the different sides of the train. Also, the discharge end of each device 10 is preferably mounted so that some marker material remains on parts of the rail car adjacent the axle with the hot box, so that when a signal has been given in the manner described, and the train has been stopped, the hot box can easily be found by a portable detector responsive to the marker material.

The marker material used is preferably non-visible, both for environmental reasons, and also so that the mode of operation of the invention does not become well known and encourage vandals to try to stop trains by use of marker materials. Suitable materials may be non-visible luminescent materials such as fluorescent material, or polarizing or radioactive materials, or more generally any material capable of activating a detector by virtue of being an emitter, reflector, or absorber of energy such as for example x-ray, infrared, ultraviolet, radio, ultrasound, microwave or heat energy. Conducting materials such as electrolytes or coils of wire could also be used. The specific marker materials may be mixed with some other material to render them less visible to the eye.

A preferred marker material is one which is fluorescent under ultraviolet light although not normally noticeable in ordinary daylight. A suitable substance is anthracene, or substances which are used in post offices for marking of letters, and also used for laundry marks. This substance is readily detected by automatic detector devices which incorporate a source of ultraviolet and have a cell sensitive to light emitted. Of course, other marker materials may be used and the detectors will be designed to respond to those materials. Preferably this material is mixed with carbon, to produce a powder which blends well with the material of a railway roadbed and is not readily noticeable to the eye.

The detector devices 62 are arranged in parts at the front and rear of the train. A front pair of detectors 62a is arranged on opposite sides of the train centreline at the front of the train and in front of all of the train axles. A second pair of detectors 62b is arranged at the rear of the train, behind all the axles, and again on opposite sides of the centreline of the train. The lateral positions of the detectors are similar to those of the signalling devices 10, so that the detectors of each pair can selectively detect marker material dropped on one side of the track so that the side of the train which has the hot box can be recognized.

At each side of the train, the two, front and rear, detector devices are connected together by a circuit including a counter, one counter being provided for the two detector devices on each side of the train. Each counter device is connected so that successive signals from a first detector switch the counter from 0 to a $-1$, a $-2$, a $-3$, . . . condition, and successive signals from the rear detector switch the counter in the opposite direction, e.g. from a $-3$ to a $-2$, a $-1$, a0, and a $+1$ condition. The counter is arranged to produce an alarm when the counter is in the $+1$ condition, for example a sound alarm for the crew, or alternately to apply the train's brakes. Accordingly, if there is marker material previously on the track it will be detected firstly by one of the front detectors which then switches the appropriate counter from 0 position to $-1$, producing no alarm, and upon detection of the same material by a rear detector the counter is advanced by $+1$ and thus returns to 0. Accordingly a marker material left on the roadbed does not produce any alarm. However, in the case of a failure of the rear detector to detect this marker material, the counter will remain erroneously in a $-1$ position. Hence the counter will not be in a position to give the alarm if the rear detector subsequently passes marker emitted by one of the devices 10, since this occurrence will only return the counter to 0. Accordingly an optional modification to the detection arrangement is provided and shown in ghost outline in FIG. 6. This modification comprises a timer arranged to reset the counter to the position it was in immediately before the front detector detected the marker material left on the roadway, this resetting occurring at a preset interval after detection of this marker material by the front detector which is adequate to allow the train to pass even at a low speed. In this way, the disruption of the system caused by the forward detector being activated, but not the rear detector, is only temporary.

However, in the case of marker material released by a device 10 on the train, between the front and rear detectors, this is only detected by a rear detector 62b which moves the appropriate counter to the $-1$ condition and gives the alarm. Thus, the system provides a comparator which is capable of receiving an input signal from each of the detectors and of producing an output signal only when an input signal is received from a rear detector without being preceeded by a corresponding input signal from a front detector.

The system is operative even if one of the devices 10 emits marker material while the train is running over marker material already on the track. In this case, the marker material on the track will move the counter from 0 to $-1$, and when the marker released by the device 10 (assuming that this is behind the marker already on the track) reaches the rear detector 62b the counter will be returned to 0, and there will be no immediate signal as a result of this marker material released by the device 10. However, as soon as the marker material which was previously on the track has reached the rear detector, this will move the counter to the $-1$ condition and produce a signal. In this case, the counter produces the alarm even though the signal from the rear detector has been preceded by a signal from the front detector; this is because the two signals have been received from the rear detector which cannot correspond to the single signal received by the front detector. It will be appreciated that although operation of the system has been described in terms of intermittent signals, these signals may be continuous.

It should be observed that in the preferred embodiment neither the front nor the rear detector devices are alone able to distinguish marker material released by the train from the other materials which can also be detected by these devices and which may be present on the track. Only when the front and rear detector devices are connected together by a circuit including the counter can the integral system so formed determine whether the material was released by the train.

The detector arrangement may of course be of value in association with devices other than hot-box signalling devices, and for example might be used in large trucks in association with tire pressure monitoring devices.

The embodiments of the invention in which an exclusive property or privilege is claimed are defined as follows:

1. A system for detecting a signal produced by a vehicle-mounted signalling device of the type adapted to expel a marker material in response to an abnormal condition sensed by said device, the system comprising:
   a first detector adapted to be mounted at a forward position on the vehicle in front of all of said signalling devices carried by the vehicle;
   a second detector adapted to be mounted at a rear position on the vehicle behind all of the said signalling devices;

each of said detectors being adapted to detect and respond to the presence of said marker material expelled by one of said signalling devices, and thereupon produce a signal; and, comparator means to which said detectors are connected, said comparator means being adapted to produce an output signal only when an input signal is received from said second detector without being preceded by a corresponding input signal from said first detector.

2. A system as claimed in claim 1, wherein each of said detectors is adapted to respond to the presence of not only the said marker material but also to other marker materials.

3. A system as claimed in claim 1, wherein said comparator means is a counter adapted to move from an initial position to register a predetermined count on receipt of an input signal from said first detector, and to register an identical but opposite count on receipt of a signal from said second detector, whereby signals received sequentially from said first and second detectors will cause the counter to reset at its initial position; the counter further being adapted to produce an output signal in response to said predetermined count from the second detector only.

4. A system as claimed in claim 3, further including timing means adapted to reset the counter to its said initial position a predetermined time after said counter has been caused to register said predetermined count on receipt of an input from said first detector without any signal being received from said second detector.

* * * * *